Patented Jan. 11, 1938

2,104,795

UNITED STATES PATENT OFFICE 2,104,795

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application June 21, 1937, Serial No. 149,474

12 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated for use in my process consists of a high molecular weight polyether carboxy acid compound of the kind hereinafter described.

The materials contemplated for use in my process are polyether carboxylic acid compounds which may be used in the form of acids, salts, or esters. For sake of convenience, I shall refer to the acids because the formation of salts or esters from carboxy acids is a well-known procedure and does not require description.

The polyether carboxy acid compounds contemplated for use in the present process are characterized by the fact that they represent an acid or salt or ester of an acid having the following characteristics: (a) It is derived from aliphatic, polyhydric alcohols containing from 2 to 4 carbon atoms; (b) there is present at least one hydrocarbon radical having at least 8 carbon atoms, said hydrocarbon radical being aliphatic, cyclo-aliphatic, alicyclic, or aralkyl in nature; (c) said hydrocarbon radical is attached to an ether radical by means of an oxygen, sulfur, or nitrogen atom or by means of a radical containing at least one of the said hetero atoms; and (d) there is present at least 2 etheric oxygen atoms and not more than 3 alkylene-oxy-radicals directly attached to each other.

Due to the fact that this type of materials represents a fairly complicated structure, it appears desirable to describe the same in reasonable detail. Reference is made to British Patent No. 456,517, dated 1936, to I. G. Farbenindustrie A.-G. Without attempting to improve upon the description of these compounds, as found in said patent, the following excerpt is taken substantially in verbatim form as it appears in said aforementioned British patent:

"* * * * * * * high molecular polyether carboxylic acids * * * can be obtained by introducing * * * into poly-ether carboxylic acids derived from aliphatic polyhydric alcohols containing from 2 to 4 carbon atoms, at least one aliphatic, cycloaliphatic or mixed aromatic aliphatic radicle containing at least 8 carbon atoms which is attached to the radicle of the said ether by means of an oxygen, sulphur or nitrogen atom or by an atomic group containing at least one of the said hetero atoms. Alternatively the said high molecular polyether carboxylic acids can be obtained by introducing * * * at least one unaltered carboxylic group into high molecular poly-ethers derived from aliphatic polyhydric alcohols containing from 2 to 4 carbon atoms and containing at least one aliphatic, cycloaliphatic or mixed aromatic aliphatic radicle containing at least 8 carbon atoms which latter is attached to the radicle of the said ether by means of an oxygen, sulphur, or nitrogen atom, or by an atomic group containing at least one of the said hetero atoms. The initial materials are so selected that the final products contain at least two ether-oxygen atoms and not more than 3 alkylaneoxy groups directly attached to one another."

Said patent discloses polyether carboxy acids of the general formula:

$$R\text{---}X\text{---}CH_2.CH_2.O.CH_2.CH_2.O.CH_2.COONa$$

in which R is an aliphatic, cycloaliphatic or mixed aromatic-aliphatic radical of high molecular weight containing at least eight carbon atoms, X is any carboxylic ester or amide group, or an ether-like oxygen or sulfur atom, the number of —CH₂— groups between two ether linkages or between an ether linkage and an ester or amide group being not more than four.

Other examples described in said British patent are the following:

R—O—CH₂—CH₂—O—CH₂—CH₂—O—CH₂—COOH
R—NH—CO—CH₂—O—CH₂—CH₂—O—CH₂—COOH
R—CO—NH—CH₂—CH₂—O—CH₂—CH₂—O—CH₂—COOH
R—O—CO—CH₂—CH₂—O—CH₂—CH₂—O—CH₂—COOH
R—CO—O—CH₂—CH₂—O—CH₂—CH₂—O—CH₂—COOH
R—S—CH₂—CH₂—O—CH₂—CH₂—O—CH₂—COOH
R—O—CH₂—CH₂—O—CH₂—CH₂—NH—CO—COOH

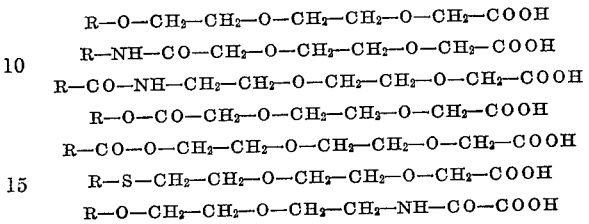

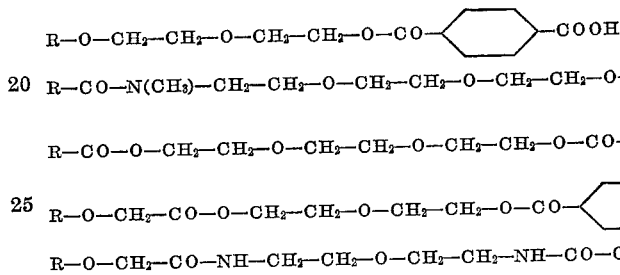

The ether radical may also be present in the side chains of the molecule, for example, condensation products of glycol, and higher fatty acids which are hydroxy-ethylated on the nitrogen atom and having the formula:

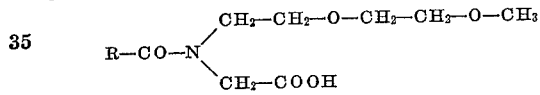

and products having the formula:

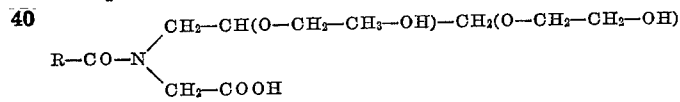

are suitable.

It is obvious that the radical R may be alicyclic in nature, as well as aliphatic, cyclo-aliphatic, or aralkyl. Similarly, where the formulas show derivatives of phthalic acid, it is obvious that any similar polybasic carboxy acid, such as naphthalic acid, diphenic, tartaric, succinic, maleic, oxalic, malic, adipic acid, sebacic, etc. could be employed. Where maleic acid or the like is employed, one could employ the well known reaction with sodium bisulfite or the like to produce a derivative of sulfo-succinic acid.

An examination of the above formulas indicates that certain residues present in the various compounds above described are obtained by the etherification of ethylene glycol, a polyhydric alcohol having two carbon atoms. Similar compounds, of course, would be obtainable from glycols having three or four carbon atoms, that is propylene glycols or butylene glycols. Similar compounds could be obtained from glycerols, polyglycerols, such as diglycerols, or from materials obtained by condensation of glycols and glycerol or the like. As to various examples of materials of the kind just described, reference is made to the various illustrations in said aforementioned British patent. Insofar that monohydric alcohols of fairly high molecular weight, for instance, having approximately ten to 22 carbon atoms, are becoming available commercially at prices which make their industrial application feasible, I prefer to use such materials as one of the raw materials for the preparation of my preferred demulsifying agent.

Another raw material which is readily available is diethylene glycol. Diethylene glycol can be combined in the customary manner with dodecyl alcohol, so as to yield diethylene glycol, monododecyl ether. If 274 parts of diethylene glycol monododecyl ether are fused with 148 parts of phthalic anhydride for from 2 to 3 hours, at approximately 140-150° C., then substantially complete reaction takes place. After cooling, the mass is dissolved in alcohol and neutralized with a suitable base, such as caustic soda, caustic potash, or the like. The alcohol is then evaporated and the salt, such as the sodium salt, is employed as a suitable form of my preferred reagent. The triethanolamine salt is also very satisfactory. Naturally, the dodecyl alcohol can be replaced by octodecyl alcohol, or by an unsaturated alcohol, such as octodecenyl alcohol. Various other amines, such as triamylamine, may be employed for neutralization.

As previously pointed out, the polyether carboxy acids of the kind described may be used as such, or may be used in any suitable form where the acidic (ionizable) hydrogen atom has been replaced by some suitable metallic atom or suitable organic radical. In many instances, it is desirable that the materials be used in the form of salts of various metals, especially in the form of salts of alkali metals, including the ammonium salt, or the substituted ammonium salt. The salts may be obtained in any suitable manner, as, for example, by reacting the acidic product resulting from the reaction (or after acidification of the reaction mass) in either a crude or purified form, with a metallic oxide or hydroxide, or with ammonia, or with an organic base. Suitable bases include sodium, potassium, and ammonium hydroxides; sodium, potassium, and ammonium carbonates and bicarbonates; aqua ammonia; magnesium oxide; calcium oxide; ethylene amine; pyridine; triethanolamine; monoethanolamine; diethanolamine; propanolamine; butylamine; monoamylamine; diamylamine; triamylamine; cyclohexylamine; benzylamine, etc. Heavy metals salts, such as iron salts, copper salts and lead salts, may also be prepared.

Similarly, the carboxy acids of the kind herein contemplated may be esterified with any one of a number of alcohols or combinations of alcohols, including the following: Monohydric alcohols, such as propyl alcohol, butyl alcohol, amyl alcohol, hexyl alcohol, octyl alcohol, decyl alcohol, duodecyl alcohol, stearyl alcohol; unsaturated mono-basic alcohols, such as oleyl alcohol; polyhydric alcohols, such as glycols, ethylene glycol, for example, glycerol, polyglycerols, etc.; ether alcohols, such as diethylene glycol butyl ether, etc.; polyhydric alcohols having at least one remaining free hydroxyl, in which one or more hydroxyl has been previously reacted with a suitable acid, such as mono-ricinolein, diricinolein, monostearin, mono-olein, or the equivalent bodies derived from polyglycerols; acid alcohols, such as hydroxy stearic acid, ricinoleic acid, polyricinoleic acid, tri-ricinolein, etc.; polyhydric alcohols, in which one or more dibasic carboxy acid residues have been introduced, such as phthalic acid residue, a maleic acid residue, an oxalic acid residue, etc. (such polyhydric alcohol bodies may be employed, providing a free hydroxyl remains); cycloalcohols, such as cyclobutanol, etc.; aromatic alcohols, such as phenol, cresol, xylenol, naphthol, etc.; aralkyl alcohols, such as benzyl alcohol; heterocyclic alcohols, such as furfuryl alcohol, abietyl alcohol, etc.; mixed isomer forms of the various alcohols, such as mixed amyl alcohols, etc.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practicing my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

Having thus described my invention, what I claim as new and desire to secure by Letters Patent is:

1. A process for breaking petroleum emulsions of the water-in-oil type, which consists in subjecting the emulsion to the action of a demulsifying agent comprising a high molecular weight polyether carboxy acid compound containing an acid radical, characterized by (a) being derived from an aliphatic polydric alcohol containing at least two carbon atoms and not more than four carbon atoms; (b) by the presence of at least one hydrocarbon radical having at least eight carbon atoms, said hydrocarbon radical being an aliphatic, cyclo-aliphatic, alicyclic, or aralkyl in nature; (c) said hydrocarbon radical being attached to an ether radical by means of an oxygen, sulfur, or nitrogen atom, or by means of a radical containing at least one of the said hetero atoms but said linkage still being through said hetero atom; and (d) the presence of at least two etheric oxygen atoms and by not more than three alkylene-oxy radicals directly attached to each other.

2. A process for breaking petroleum emulsions of the water-in-oil type, which consists in subjecting the emulsion to the action of a demulsifying agent comprising a high molecular weight polyether carboxy acid compound containing an acid radical, characterized by (a) being derived from an aliphatic polyhydric alcohol containing at least two carbon atoms and not more than four carbon atoms; (b) by the presence of at least one hydrocarbon radical having at least eight carbon atoms, said hydrocarbon radical being an aliphatic, cycloaliphatic, alicyclic, or aralkyl in nature; (c) said hydrocarbon radical being attached to an ether radical by means of an oxygen atom, or by means of a radical containing at least one oxygen atom but said linkage still being through said oxygen atom; and (d) the presence of at least two etheric oxygen atoms and by not more than three alkylene-oxy radicals directly attached to each other.

3. A process for breaking petroleum emulsions of the water-in-oil type, which consists in subjecting the emulsion to the action of a demulsifying agent comprising a high molecular weight polyether carboxy acid compound containing an acid radical, characterized by (a) being derived from an aliphatic polyhydric alcohol containing at least two carbon atoms and not more than four carbon atoms; (b) by the presence of at least one hydrocarbon radical having at least eight carbon atoms, said hydrocarbon radical being an aliphatic, cyclo-aliphatic, alicyclic, or aralkyl in nature; (c) said hydrocarbon radical being attached to an ether radical by means of a sulfur atom, or by means of a radical containing at least one sulfur atom but said linkage still being through said oxygen atom; and (d) the presence of at least two etheric sulfur atoms and by not more than three alkylene-oxy radicals directly attached to each other.

4. A process for breaking petroleum emulsions of the water-in-oil type, which consists in subjecting the emulsion to the action of a demulsifying agent comprising a high molecular weight polyether carboxy acid compound containing an acid radical, characterized by (a) being derived from an aliphatic polyhydric alcohol containing at least two carbon atoms and not more than four carbon atoms; (b) by the presence of at least one hydrocarbon radical having at least eight carbon atoms, said hydrocarbon radical being an aliphatic, cyclo-aliphatic, alicyclic, or aralkyl in nature; (c) said hydrocarbon radical being attached to an ether radical by means of a nitrogen atom, or by means of a radical containing at least one nitrogen atom but said linkage still being through said nitrogen atom; and (d) the presence of at least two etheric nitrogen atoms and by not more than three alkylene-oxy radicals directly attached to each other.

5. A process for breaking petroleum emulsions of the water-in-oil type, which consists in subjecting the emulsion to the action of a demulsifying agent comprising a high molecular weight polyether carboxy acid compound containing an acid radical, characterized by (a) being derived from an aliphatic polyhydric alcohol containing at least two carbon atoms and not more than four carbon atoms; (b) by the presence of at least one aliphatic hydrocarbon radical having at least eight carbon atoms; (c) said hydrocarbon radical being attached to an ether radical by means of an oxygen atom, or by means of a radical containing at least one oxygen atom but said linkage still being through said oxygen atom; and (d) the presence of at least two etheric oxygen atoms and by not more than three alkylene-oxy radicals directly attached to each other.

6. A process for breaking petroleum emulsions of the water-in-oil type, which consists in subjecting the emulsion to the action of a demulsifying agent comprising a high molecular weight polyether carboxy acid compound containing an acid radical, characterized by (a) being derived from an aliphatic polyhydric alcohol containing at least two carbon atoms and not more than four carbon atoms; (b) by the presence of at least one aliphatic hydrocarbon radical having at least eight carbon atoms; (c) said hydrocarbon radical being attached to an ether radical by means of an oxygen atom, or by means of a radical containing at least one oxygen atom but said linkage still being through said oxygen atom; and (d) the presence of at least two etheric oxygen atoms and by not more than three alkylene-oxy radicals directly attached to each other, and being additionally characterized by the fact that the carboxy acid radical is of the aromatic type.

7. A process for breaking petroleum emulsions of the water-in-oil type, which consists in subjecting the emulsion to the action of a demulsifying agent comprising a high molecular weight polyether carboxy acid compound containing an acid radical, characterized by (a) being derived from an aliphatic polyhydric alcohol containing at least two carbon atoms and not more than four carbon atoms; (b) by the presence of at least one aliphatic hydrocarbon radical having at least eight carbon atoms; (c) said hydrocarbon radical being attached to an ether radical by means of an oxygen atom, or by means of a radical containing at least one oxygen atom but said linkage still being through said oxygen atom; and (d) the presence of at least two etheric oxygen atoms and by not more than three alkylene-oxy radicals directly attached to each other, and being additionally characterized by the fact that the carboxy radical is derived from phthalic acid.

8. A process for breaking petroleum emulsions of the water-in-oil type, which consists in subjecting the emulsion to the action of a demulsifying agent comprising a high molecular weight polyether carboxy acid compound containing an acid radical, characterized by (a) being derived from a glycol; (b) by the presence of at least one aliphatic hydrocarbon radical having at least eight carbon atoms; (c) said hydrocarbon radical being attached to an ether radical by means of an oxygen atom, or by means of a radical containing at least one oxygen atom but said linkage still being through said oxygen atom; and (d) the presence of at least two etheric oxygen atoms and by not more than three alkylene-oxy radicals directly attached to each other, and being additionally characterized by the fact that the carboxy radical is derived from phthalic acid.

9. A process for breaking petroleum emulsions of the water-in-oil type, which consists in subjecting the emulsion to the action of a demulsifying agent comprising a high molecular weight polyether carboxy acid compound containing an acid radical, characterized by (a) being derived from ethylene glycol; (b) by the presence of at least one aliphatic hydrocarbon radical having at least eight carbon atoms; (c) said hydrocarbon radical being attached to an ether radical by means of an oxygen atom, or by means of a radical containing at least one oxygen atom but said linkage still being through said oxygen atom; and (d) the presence of at least two etheric oxygen atoms and by not more than three alkylene-oxy radicals directly attached to each other, and being additionally characterized by the fact that the carboxy radical is derived from phthalic acid.

10. A process for breaking petroleum emulsions of the water-in-oil type, which consists in subjecting the emulsion to the action of a demulsifying agent in the form of a salt comprising a high molecular weight polyether carboxy acid compound containing an acid radical, characterized by (a) being derived from ethylene glycol; (b) by the presence of at least one aliphatic hydrocarbon radical having at least eight carbon atoms; (c) said hydrocarbon radical being attached to an ether radical by means of an oxygen atom, or by means of a radical containing at least one oxygen atom but said linkage still being through said oxygen atom; and (d) the presence of at least two etheric oxygen atoms and by not more than three alkylene-oxy radicals directly attached to each other, and being additionally characterized by the fact that the carboxy radical is derived from phthalic acid.

11. A process for breaking petroleum emulsions of the water-in-oil type, which consists in subjecting the emulsion to the action of a demulsifying agent in the form of a water-soluble salt comprising a high molecular weight polyether carboxy acid compound containing an acid radical, characterized by (a) being derived from ethylene glycol; (b) by the presence of at least one aliphatic hydrocarbon radical having at least eight carbon atoms; (c) said hydrocarbon radical being attached to an ether radical by means of an oxygen atom, or by means of a radical containing at least one oxygen atom but said linkage still being through said oxygen atom; and (d) the presence of at least two etheric oxygen atoms and by not more than three alkylene-oxy radicals directly attached to each other, and being additionally characterized by the fact that the carboxy radical is derived from phthalic acid.

12. A process for breaking petroleum emulsions of the water-in-oil type, which consists in subjecting the emulsion to the action of a demulsifying agent in the form of a water-soluble sodium salt comprising a high molecular weight polyether carboxy acid compound containing an acid radical, characterized by (a) being derived from ethylene glycol; (b) by the presence of at least one aliphatic hydrocarbon radical having at least eight carbon atoms; (c) said hydrocarbon radical being attached to an ether radical by means of an oxygen atom, or by means of a radical containing at least one oxygen atom but said linkage still being through said oxygen atom; and (d) the presence of at least two etheric oxygen atoms and by not more than three alkylene-oxy radicals directly attached to each other, and being additionally characterized by the fact that the carboxy radical is derived from phthalic acid.

MELVIN DE GROOTE.